(12) United States Patent
Maeda

(10) Patent No.: US 7,058,520 B2
(45) Date of Patent: Jun. 6, 2006

(54) METHOD AND APPARATUS FOR DETECTING MAXIMUM AND MINIMUM VALUES, AND TORQUE DETECTING APPARATUS AND STEERING APPARATUS COMPRISING THE MAXIMUM AND MINIMUM VALUES DETECTING APPARATUS

(75) Inventor: Naoki Maeda, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 417 days.

(21) Appl. No.: 10/121,591

(22) Filed: Apr. 15, 2002

(65) Prior Publication Data
US 2002/0153875 A1 Oct. 24, 2002

(30) Foreign Application Priority Data
Apr. 24, 2001 (JP) ............... 2001-126679

(51) Int. Cl.
*G01L 1/00* (2006.01)
*G01L 3/00* (2006.01)
*G01L 5/00* (2006.01)
*G06F 19/00* (2006.01)

(52) U.S. Cl. .................................. 702/41
(58) Field of Classification Search .................. 702/3, 702/41, 84; 73/861.28, 862.326; 324/207.25, 324/207.22; 375/355, 240.2; 356/619; 369/59.17; 332/1
See application file for complete search history.

(56) References Cited

U.S. PATENT DOCUMENTS 4,001,728 A * 1/1977 Schneider ............... 332/184
4,318,617 A * 3/1982 Orsen ..................... 356/619
4,874,053 A 10/1989 Kimura et al.
4,881,414 A 11/1989 Setaka et al.
5,208,535 A * 5/1993 Nakayama et al. ......... 324/318
5,398,555 A * 3/1995 Ueno et al. ............ 73/862.326
5,703,652 A * 12/1997 Kondo et al. .......... 375/240.24
5,714,883 A * 2/1998 Schroeder et al. ..... 324/207.22
6,091,687 A * 7/2000 Verboom et al. ........ 369/59.17
6,348,790 B1 * 2/2002 Aler et al. ............. 324/207.25
6,484,592 B1 * 11/2002 Sezaki ................... 73/862.335
6,519,303 B1 * 2/2003 Matsuda et al. ............ 375/355
2003/0043937 A1* 3/2003 Kobayashi et al. ......... 375/340

FOREIGN PATENT DOCUMENTS

| EP | 1 087 218 A1 | 3/2001 |
|----|--------------|--------|
| EP | 1087218 A * | 3/2001 |
| JP | 2001-324321 | 11/2001 |

* cited by examiner

*Primary Examiner*—Bryan Bui
*Assistant Examiner*—Aditya S. Bhat
(74) *Attorney, Agent, or Firm*—Birch,Stewart,Kolasch & Birch,LLP

(57) ABSTRACT

The method and apparatus for detecting maximum and minimum values, and the torque detecting apparatus and steering apparatus comprising the maximum and minimum values detecting apparatus can detect maximum and minimum values of detection signals without setting a particular value such as a threshold. A signal processing unit provided at the maximum and minimum values detecting apparatus detects a crossing of two detection signals outputted from two MR sensors, and detects maximum and minimum values of the signals based on maximum and minimum values of the signals detected within a time interval defined by the time when a crossing is detected.

20 Claims, 10 Drawing Sheets

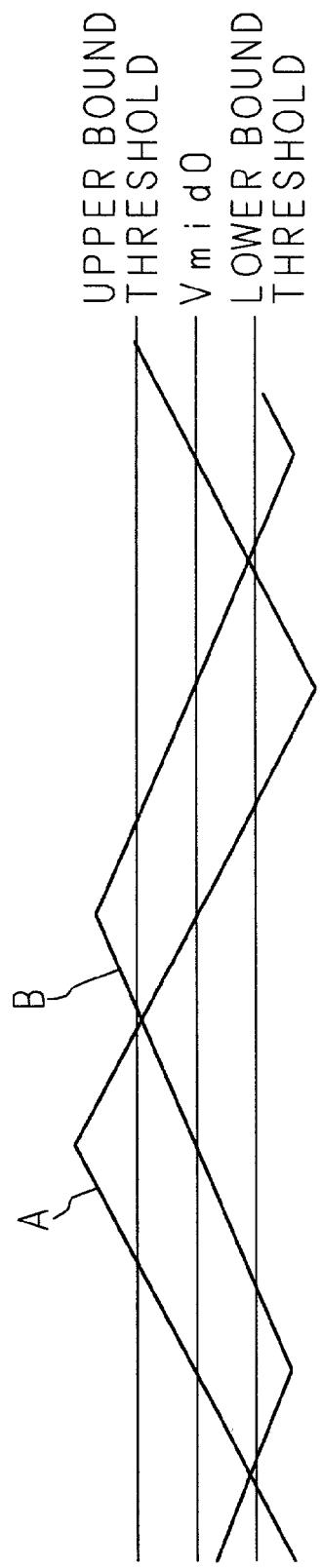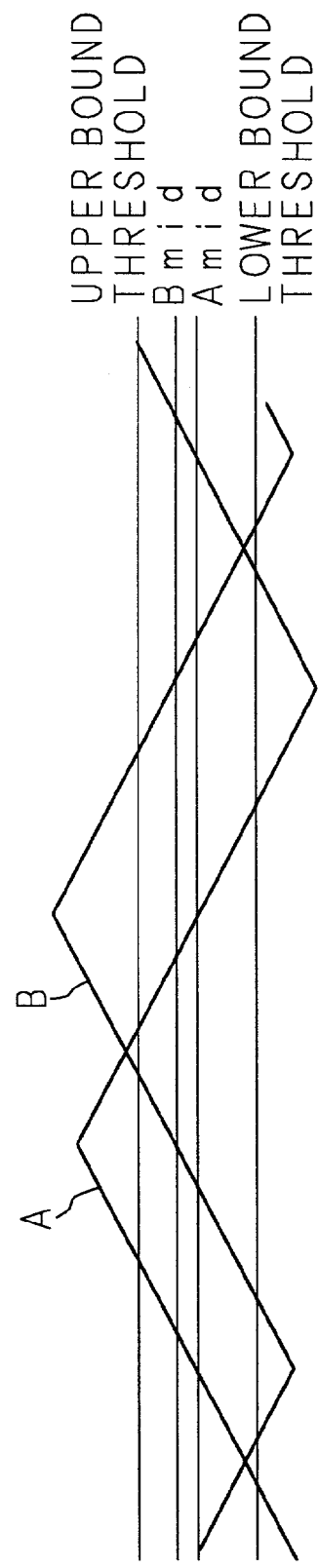

METHOD AND APPARATUS FOR DETECTING MAXIMUM AND MINIMUM VALUES, AND TORQUE DETECTING APPARATUS AND STEERING APPARATUS COMPRISING THE MAXIMUM AND MINIMUM VALUES DETECTING APPARATUS

This application claims foreign priority benefit of Japanese Patent Application 2001-126679 filed on Apr. 24, 2001, the disclosure of which is hereby incorporated by reference.

BACKGROUND OF THE INVENTION

1. Field of the Invention

The present invention relates to a method and an apparatus for detecting maximum and minimum values of two detection signals with different phases which are outputted from a rotational angle detecting device provided in a torque detecting apparatus and a steering apparatus, and a torque detecting apparatus and a steering apparatus comprising the maximum and minimum values detecting apparatus.

2. Description of Related Art

Some steering apparatuses for vehicles assist steering by driving an electric motor so as to reduce driver's load. Such a steering apparatus comprises: an input shaft joined to a steering wheel; an output shaft joined to tire wheels via a pinion and a rack, for example; a connecting shaft for connecting the input shaft and the output shaft; a torque detecting apparatus for detecting a steering torque applied to the input shaft based on a torsional angle generated on the connecting shaft; and a steering assist electric motor interlocked with the output shaft, which is driven in a controlled manner based on the steering torque detected by the torque detecting apparatus.

FIG. 1 is a schematic representation which schematically shows a constitution of a rotational angle detecting device and a torque detecting apparatus proposed by the present applicant in Japanese Patent Application Laid-Open No. 2001-324321. FIG. 2 is a vertical sectional view showing a constitution of a main part of a steering apparatus comprising the rotational angle detecting device and the torque detecting apparatus.

An input shaft 16 is connected to a steering wheel 1 at an upper end thereof. An output shaft 17 is connected to a pinion 18 of a steering mechanism at a lower end thereof. The input shaft 16 and the output shaft 17 are coaxially connected to each other via a torsion bar 19 (a connecting shaft) of a small diameter, to constitute a steering shaft 13 which connects the steering wheel 1 and the steering mechanism. The input shaft 16 and output shaft 17 have portions proximal to a connection portion which are constituted as described below. The input shaft 16 and output shaft 17 are supported in a housing 23 via bearings 21 and 22, so as to be rotatable respectively. The housing 23 is fixed at an unshakable portion of a vehicle, with a mounting bracket 24.

The housing 23 houses a sensor box 11 of a torque detecting apparatus, which will be described below, and a reduction mechanism 25 for reducing rotation of a steering assist electric motor 26, which is driven based on a result detected by the torque detecting apparatus, and transmitting the reduced rotation to the output shaft 17. The electric motor 26 is rotated so as to assist operations of the steering mechanism in accordance with rotation of the steering wheel 1, so that driver's load for steering can be reduced. A lower end portion of the output shaft 17 is connected to a steering mechanism of a rack-and-pinion type via a universal joint.

A disc-shaped target plate 12 (a rotational member) is coaxially fixed at a peripheral surface of a portion of the input shaft 16, which is proximal to an end portion connected to the output shaft 17. The target plate 12 has a plurality of (five in FIG. 1) targets 15 which are juxtaposed on a peripheral surface of the target plate 12.

Each target 15 is a protrusion made of a magnetic material which comprises a first inclined portion 15a which is inclined to one direction and a second inclined portion 15b which is inclined to another direction along a peripheral surface of the target plate 12, as shown in a development elevation in FIG. 3 which shows the peripheral surface of the target plate 12 in a developed form. The targets 15 are juxtaposed on the peripheral surface of the target plate 12 at regular intervals in a peripheral direction.

The first inclined portion 15a and second inclined portion 15b are provided approximately symmetrically with respect to a line which passes a connection point of the portions 15a and 15b and is parallel to a rotational axis of the target plate 12.

Another target plate 12, which comprises the same targets as those described above, is fixed at a peripheral surface of a portion of the output shaft 17, which is proximal to an end portion connected to the input shaft 16. Each target 15 provided on the target plate 12 of the output shaft 17 and each target 15 provided on the target plate 12 of the input shaft 16 are aligned in a peripheral direction.

The sensor box 11 is provided outside the target plates 12, to face the periphery of targets 15 on the peripheral surface of the target plates 12. The sensor box 11 is fixedly supported at the housing 23 which supports the input shaft 16 and output shaft 17 so as to be rotatable. The sensor box 11 houses MR sensors 1A and 1B (first detecting means and second detecting means) which oppose two different portions in a peripheral direction of the targets 15 of the input shaft 16, and MR sensors 2A and 2B (first detecting means and second detecting means) which oppose two different portions in a peripheral direction of the targets 15 of the output shaft 17. The MR sensors 1A and 1B and the MR sensors 2A and 2B are housed with the peripheral positions thereof aligned accurately.

Each of the MR sensors 1A, 2A, 1B and 2B is composed of an element, such as a magneto-resistance effect element (an MR element), having an electric characteristic (a resistance) which changes by the action of a magnetic field, so that a detection signal changes in accordance with a proximal portion of the target 15 which the MR sensor faces. Detection signals from the MR sensors 1A, 2A, 1B and 2B are supplied to a signal processing unit 14 which uses a microprocessor, which is provided outside or inside the sensor box 11.

The following description will explain in brief the operations of the rotational angle detecting device and torque detecting apparatus having such a constitution.

As described above, each of the targets 15, which the MR sensors 1A, 2A, 1B and 2B face, is a protrusion made of a magnetic material which comprises a first inclined portion 15a which is inclined to one direction and a second inclined portion 15b which is inclined to another direction along each peripheral surface of each target plate 12 coaxially fixed at each of the peripheral surfaces of the input shaft 16 and output shaft 17, the first and second inclined portions 15a and 15b being juxtaposed at regular intervals in a peripheral direction.

Consequently, when the input shaft 16 (or the output shaft 17) is rotated on an axis, each of the MR sensors 1A and 1B (or 2A and 2B) outputs detection signals (referred to as "A"

and "B") which rise and fall proportionally in accordance with change of the rotational angle of the input shaft 16 (or the output shaft 17), as shown in FIG. 4, while the corresponding targets 15 pass a position opposing each MR sensor.

The detection signals of the MR sensors 1A and 1B correspond to the rotational angle of the input shaft 16 which is provided with the targets 15 corresponding to the MR sensors 1A and 1B. The detection signals of the MR sensors 2A and 2B correspond to the rotational angle of the output shaft 17 which is provided with the targets 15 corresponding to the MR sensors 2A and 2B.

As a result, the signal processing unit 14 can calculate the rotational angle of the input shaft 16 based on the detection signals of the MR sensors 1A and 1B, i.e., the signal processing unit 14 and the MR sensors 1A and 1B operate as a rotational angle detecting device for the input shaft 16. Meanwhile, the signal processing unit 14 can calculate the rotational angle of the output shaft 17 based on the detection signals of the MR sensors 2A and 2B, i.e., the signal processing unit 14 and the MR sensors 2A and 2B operate as a rotational angle detecting device for the output shaft 17.

When a rotational torque is applied to the input shaft 16, there arises a difference between each of the detection signals of the MR sensors 1A and 1B and each of the detection signals of the MR sensors 2A and 2B.

The phase of the MR sensors 1A, 2A and the phase of the MR sensors 1B, 2B are different from each other in a peripheral direction of the target plates 12, at an electric angle of 90° for example. Consequently, the detection signals can compensate a non-linearly changing range mutually. The phase angle may be any electric angle of 1° through 360° if the compensation is possible.

The difference between the detection signal of the MR sensor 1A and the detection signal of the MR sensor 2A, or the difference between the detection signal of the MR sensor 1B and the detection signal of the MR sensor 2B, corresponds to a difference (a relative angular displacement) of the rotational angle of the input shaft 16 and the rotational angle of the output shaft 17. The relative angular displacement corresponds to a torsional angle which arises on the torsion bar 19 connecting the input shaft 16 and the output shaft 17 by the action of the rotational torque applied to the input shaft 16. Consequently, the rotational torque applied to the input shaft 16 can be calculated based on the difference of the detection signals described above.

Each individual MR sensor 1A, 2A, 1B or 2B has a peculiar output characteristic. Consequently, there arises an error in an amplitude of the detection signals of the MR sensors 1A, 2A, 1B and 2B caused by difference in gain characteristics shown in FIG. 5A, and there arises an error in a median of the detection signals caused by difference in offsets shown in FIG. 5B. When the detection signals include an error, a torque cannot be calculated accurately. To calculate the rotational torque with high accuracy, it is required to correct medians Amid and Bmid and amplitudes App and Bpp of the detection signals A and B to be values (a reference median Vmid0 and a reference amplitude Vpp0) which were set in designing the torque detecting apparatus.

One method for correcting the detection signals is a method to store in advance a translation table in the signal processing unit 14, which translation table, for example, includes signal values to be outputted from detection signals A and B and corresponding corrected signal values, when manufacturing and assembling the torque detecting apparatus. By referring to the translation table, the signal processing unit 14 can output corrected detection signals corresponding to the detection signals outputted from the MR sensors 1A, 2A, 1B and 2B.

However, to make the translation table, it is necessary to survey the output characteristics of all the MR sensors. Moreover, it is also necessary to add an area for storing the translation table in the signal processing unit 14. The above method demands much labor and high costs for making the translation table.

Another correcting method is a method to detect maximum values Amax and Bmax and minimum values Amin and Bmin of the detection signals A and B by the signal processing unit 14, to calculate amplitudes of the detection signals A and B with the formulas:

$App = Amax - Amin$ $Bpp = Bmax - Bmin$ to calculate medians of the detection signals A and B with the formulas:

$Amid = (Amax + Amin)/2$ $Bmid = (Bmax + Bmin)/2$ and to correct the amplitudes and medians of the detection signals A and B to be the reference amplitude Vpp0 and the reference median Vmid0.

Maximum and minimum values of the detection signals A and B can be calculated based on maximum and minimum values of signal values detected within a period. However, a period of the detection signals A and B changes in accordance with a rotational speed of the steering wheel 1 which is manipulated by a man. It is hard to detect maximum and minimum values when a period is not constant.

A proposed method for detecting maximum and minimum values of the signals A and B having a changing period is a method to set an upper bound threshold and a lower bound threshold as shown in FIG. 4, to detect passing of a maximum value and a minimum value when the upper and lower bound thresholds and the detection signals A and B cross at a predetermined angle, and to detect maximum and minimum values based on signal values detected within a time range when the passing was detected.

However, in the above method, it is necessary to preset thresholds. Moreover, it is impossible to detect passing of a maximum value or a minimum value when the detection signals A and B do not come to the upper bound threshold or the lower bound threshold.

BRIEF SUMMARY OF THE INVENTION

The present invention has been made with the aim of solving the above problem, and it is an object thereof to provide a method and an apparatus for detecting maximum and minimum values, and a torque detecting apparatus and a steering apparatus comprising the maximum and minimum values detecting apparatus in which it is unnecessary to set a particular value such as a threshold.

A maximum and minimum values detecting method according to the present invention is a method to detect maximum and minimum values of a first signal and a second signal having different phases. The maximum and minimum values detecting method comprises: a crossing detecting step for detecting a crossing of the first signal and the second signal; a step for detecting maximum and minimum values of each of the signals within a time interval between a series of two detected crossings; and a deciding step for deciding maximum and minimum values of each of the signals based on the maximum and minimum values detected within the time interval.

As shown in FIG. 4, for example, the signals A and B (a first signal and a second signal) pass a maximum value of the signal A and a minimum value of the signal B, or a minimum value of the signal A and a maximum value of the signal B, within the time interval Tc between a series of two detected crossings. Maximum and minimum values of the signals A and B can be detected based on the maximum and minimum values of the signals A and B detected within the time interval Tc. Since passing of the maximum and minimum values are detected based on the crossings of the signals A and B, it is unnecessary to set a particular value such as a threshold. Moreover, there is no problem such that the signals do not exceed a threshold thereby disenabling correction, and correction can be performed reliably.

In the maximum and minimum values detecting method, the crossing detecting step further comprises a step for comparing each magnitude of signal values of the series of two detected crossings with a magnitude of a value to be a median of the signals. When one of the two comparison results indicates that the median is larger and the other indicates that the median is smaller, maximum and minimum values of each of the signals are detected based on the maximum and minimum values detected within the time interval.

As shown in FIG. 4, for example, when one signal value of the two crossings is larger than a reference median and the other signal value of the two crossings is smaller than the reference median, the signals A and B pass a maximum value and a minimum value within the time interval Tc. Passing of a maximum value or a minimum value can be judged by comparing each magnitude of signal values of the two crossings with a magnitude of the reference median. Detection of maximum and minimum values of the signals A and B is performed only when the passing is judged, and the signals A and B are corrected.

In a maximum and minimum values detecting method according to an embodiment of the present invention, the deciding step further comprises: a first comparing step for comparing a magnitude of a signal value larger than the median with each magnitude of maximum values of the signals within the time interval; a second comparing step for comparing a magnitude of a signal value smaller than the median with each magnitude of minimum values of the signals within the time interval; and a step for deciding a maximum value of the first signal and a minimum value of the second signal, or a minimum value of the first signal and a maximum value of the second signal, in accordance with the comparison results of the first and second comparing steps.

As shown in FIG. 4, for example, maximum values of the signals A and B within the time interval Tc are larger than the signal values of the detected crossings, and minimum values of the signals A and B within the time interval Tc are smaller than the signal values of the detected crossings. Consequently, a maximum value of the signal A and a minimum value of the signal B, or a minimum value of the signal A and a maximum value of the signal B, can be detected based on a comparison result between the signal value of a detected crossing larger than the reference median and the maximum value detected within the time interval and a comparison result between the signal value of a detected crossing smaller than the reference median and the minimum value detected within the time interval.

In a maximum and minimum values detecting method according to another embodiment of the present invention, the deciding step further comprises: a third comparing step for comparing a magnitude of a maximum value of the first signal detected within the time interval with a magnitude of a maximum value of the second signal detected within the time interval; a fourth comparing step for comparing a magnitude of a minimum value of the first signal detected within the time interval with a magnitude of a minimum value of the second signal detected within the time interval; and a step for deciding a maximum value of the first signal and a minimum value of the second signal, or a minimum value of the first signal and a maximum value of the second signal, in accordance with the comparison results of the third and fourth comparing steps.

As shown in FIG. 4, for example, the larger one of the maximum values of the signals A and B detected within the time interval Tc is a maximum value of a signal A or B, and the smaller one of the minimum values of the signals A and B detected within the time interval Tc is a minimum value of a signal A or B. Consequently, a maximum value of the signal A and a minimum value of the signal B, or a minimum value of the signal A and a maximum value of the signal B, can be detected based on a comparison result between the maximum value of the signal A detected within the time interval Tc and the maximum value of the signal B detected within the time interval Tc and a comparison result between the minimum value of the signal A detected within the time interval Tc and the minimum value of the signal B detected within the time interval Tc.

A maximum and minimum values detecting apparatus according to the present invention for detecting maximum and minimum values of a first signal and a second signal having different phases comprises: crossing detecting means for detecting a crossing of the first signal and second signal; means for detecting maximum and minimum values of each of the signals within a time interval between a series of two detected crossings; and deciding means for deciding maximum and minimum values of each of the signals, based on the maximum and minimum values detected within the time interval.

As shown in FIG. 4, for example, the signals A and B (a first signal and a second signal) pass a maximum value of the signal A and a minimum value of the signal B, or a minimum value of the signal A and a maximum value of the signal B, within the time interval Tc between a series of two detected crossings. Maximum and minimum values of the signals A and B can be detected based on the maximum and minimum values of the signals A and B detected within the time interval Tc. Since passing of the maximum and minimum values can be detected based on the crossings of the signals A and B which are detected by the crossing detecting means, it is unnecessary to set a particular value such as a threshold. Moreover, there is no problem such that the signals do not exceed a threshold thereby disenabling correction, and correction can be performed reliably.

In the maximum and minimum values detecting apparatus, the crossing detecting means further comprises: first comparing means for comparing each magnitude of signal values of the two detected crossings with a magnitude of a value to be a median of the signals; and means for judging whether one of the two comparison results by the first comparing means indicates that the median is larger and the other indicates that the median is smaller.

As shown in FIG. 4, for example, when one signal value of the two crossings is larger than a reference median and the other signal value is smaller than the reference median, the signals A and B pass a maximum value and a minimum value within the time interval Tc. Passing of the maximum value or the minimum value can be judged by comparing each magnitude of signal values of the two detected crossings with a magnitude of the reference median by the first comparing means. Detection of maximum and minimum values of the signals A and B is performed only when the passing is detected, and the signals A and B are corrected.

In a maximum and minimum values detecting apparatus according to an embodiment of the present invention, the deciding means further comprises: second comparing means for comparing a magnitude of a signal value larger than the median with each magnitude of maximum values of the signals detected within the time interval, and for comparing a magnitude of a signal value smaller than the median with each magnitude of minimum values of the signals detected within the time interval; and means for deciding a maximum value of the first signal and a minimum value of the second signal, or a minimum value of the first signal and a maximum value of the second signal, in accordance with the comparison results by the second comparing means.

As shown in FIG. 4, for example, maximum values of the signals A and B within the time interval Tc are larger than the signal value of the detected crossing, and minimum values of the signals A and B within the time interval Tc are smaller than the signal value of the detected crossing. Consequently, a maximum value of the signal A and a minimum value of the signal B, or a minimum value of the signal A and a maximum value of the signal B, can be detected based on a comparison result by the second comparing means between the signal value of the detected crossing larger than the reference median and the maximum value detected within the time interval Tc and a comparison result by the second comparing means between the signal value of the detected crossing smaller than the reference median and the minimum value detected within the time interval Tc.

In a maximum and minimum values detecting apparatus according to another embodiment of the present invention, the deciding means further comprises: third comparing means for comparing a magnitude of a maximum value of the first signal detected within the time interval with a magnitude of a maximum value of the second signal detected within the time interval, and for comparing a magnitude of a minimum value of the first signal detected within the time interval with a magnitude of a minimum value of the second signal detected within the time interval; and means for deciding a maximum value of the first signal and a minimum value of the second signal, or a minimum value of the first signal and a maximum value of the second signal, in accordance with the comparison results by the third comparing means.

As shown in FIG. 4, for example, the larger one of the maximum values of the signals A and B detected within the time interval Tc is a maximum value of a signal A or B, and the smaller one of the minimum values of the signals A and B detected within the time interval Tc is a minimum value of a signal A or B. Consequently, a maximum value of the signal A and a minimum value of the signal B, or a minimum value of the signal A and a maximum value of the signal B, can be detected based on a comparison result by the third comparing means between the maximum value of the signal A detected within the time interval Tc and the maximum value of the signal B detected within the time interval Tc and a comparison result by the third comparing means between the minimum value of the signal A detected within the time interval Tc and the minimum value of the signal B detected within the time interval Tc.

A torque detecting apparatus according to the present invention comprises: an input shaft and an output shaft connected to each other via a connecting shaft; a target provided at the input shaft and output shaft, which is so shaped that an axial position thereof changes continuously as the input shaft and output shaft respectively rotates; first detecting means for detecting a proximal portion of the target; second detecting means for detecting a proximal portion of the target, which outputs a detection signal having a phase different from a phase of the detection signal outputted from the first detecting means at a predetermined electric angle; a maximum and minimum values detecting apparatus according to the present invention, for detecting maximum and minimum values of detection signals outputted from the first detecting means and second detecting means; a correcting apparatus for correcting values of the detection signals based on a median and an amplitude of the detected maximum and minimum values; and means for detecting angular displacements in a rotational direction of the input shaft and output shaft based on the detection signals corrected by the correcting apparatus. The torque detecting apparatus detects a torque applied to the input shaft based on a difference between the angular displacements of the input shaft and output shaft.

Such a torque detecting apparatus corrects a median and an amplitude of the maximum and minimum values detected by the maximum and minimum values detecting apparatus to be a reference median and a reference amplitude. A torque can be detected with high accuracy by detecting angular displacements in a rotational angle of the input shaft and output shaft based on the corrected detection signals.

A steering apparatus according to the present invention comprises; an input shaft joined to a steering wheel; an output shaft joined to tire wheels; a torque detecting apparatus according to the present invention, for detecting a steering torque applied to the input shaft; and an electric motor for assisting rotation of the output shaft, which is driven in a controlled manner based on the detected steering torque.

Such a steering apparatus detects a torque with high accuracy with the torque detecting apparatus comprising the maximum and minimum values detecting apparatus. Based on the accurately detected torque, the steering assist electric motor can be controlled reliably.

The above and further objects and features of the invention will more fully be apparent from the following detailed description with accompanying drawings.

BRIEF DESCRIPTION OF THE SEVERAL VIEWS OF THE DRAWINGS

FIG. 5A is a view showing an error of an amplitude in the detection signals shown in FIG. 1;

FIG. 5B is a view showing an error of a median in the detection signals shown in FIG. 1;

DETAILED DESCRIPTION OF THE INVENTION

The following description will explain the present invention in detail with reference to the drawings illustrating some embodiments thereof.

First Embodiment

Figure 1:
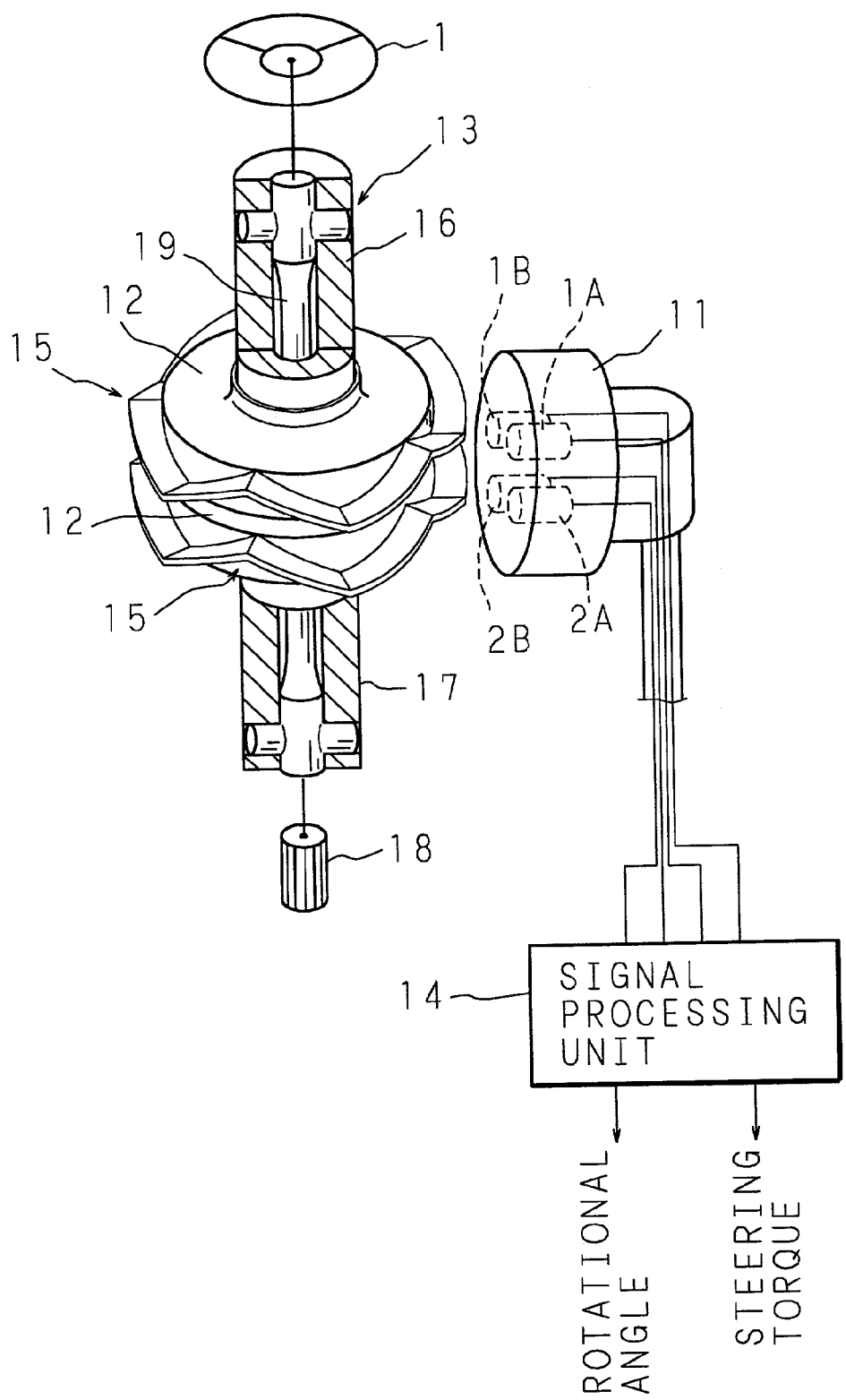
FIG. 1 is a schematic representation which schematically shows an example of a constitution of a rotational angle detecting device and a torque detecting apparatus.
Figure 2:
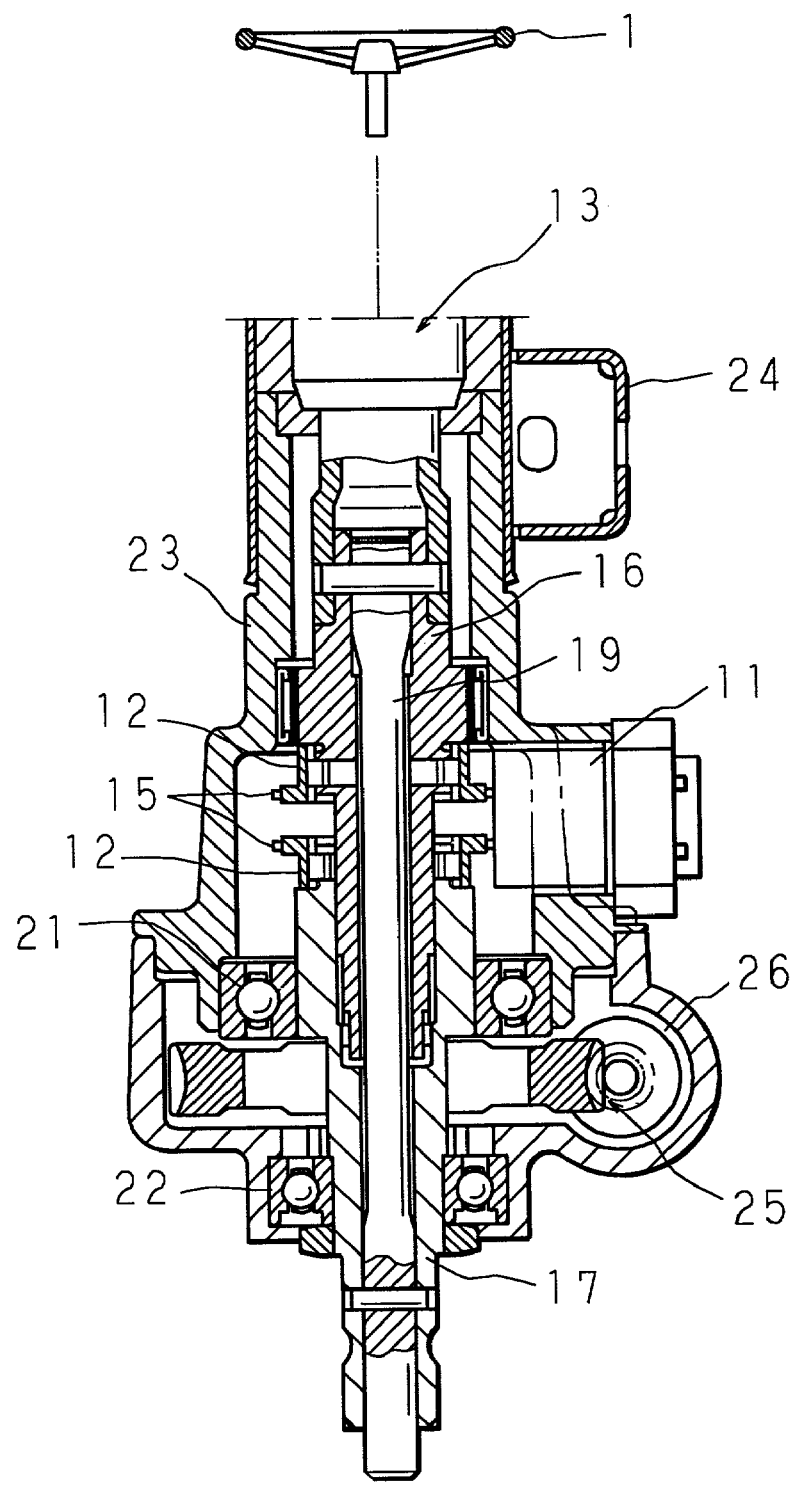
FIG. 2 is a vertical sectional view showing a constitution of a main part of a steering apparatus comprising the rotational angle detecting device and the torque detecting apparatus.
Figure 3:
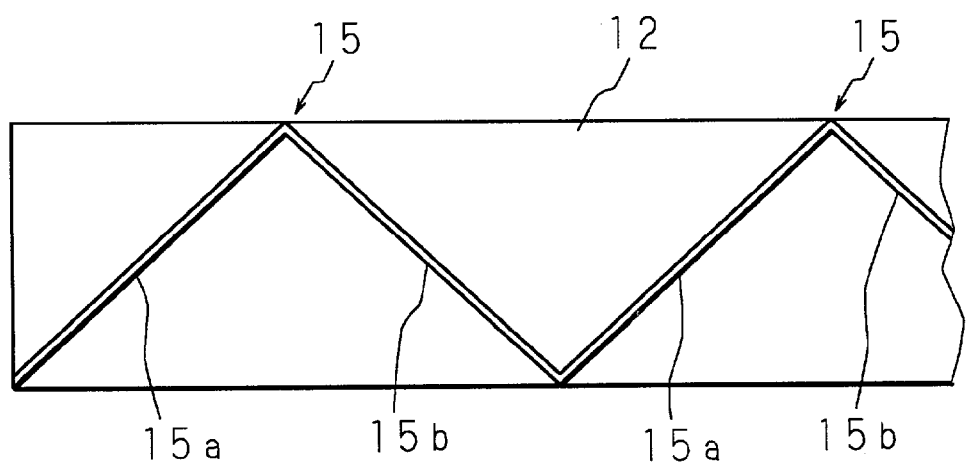
FIG. 3 is a development elevation which shows the peripheral surface of the target plate in a developed form.
Figure 4:
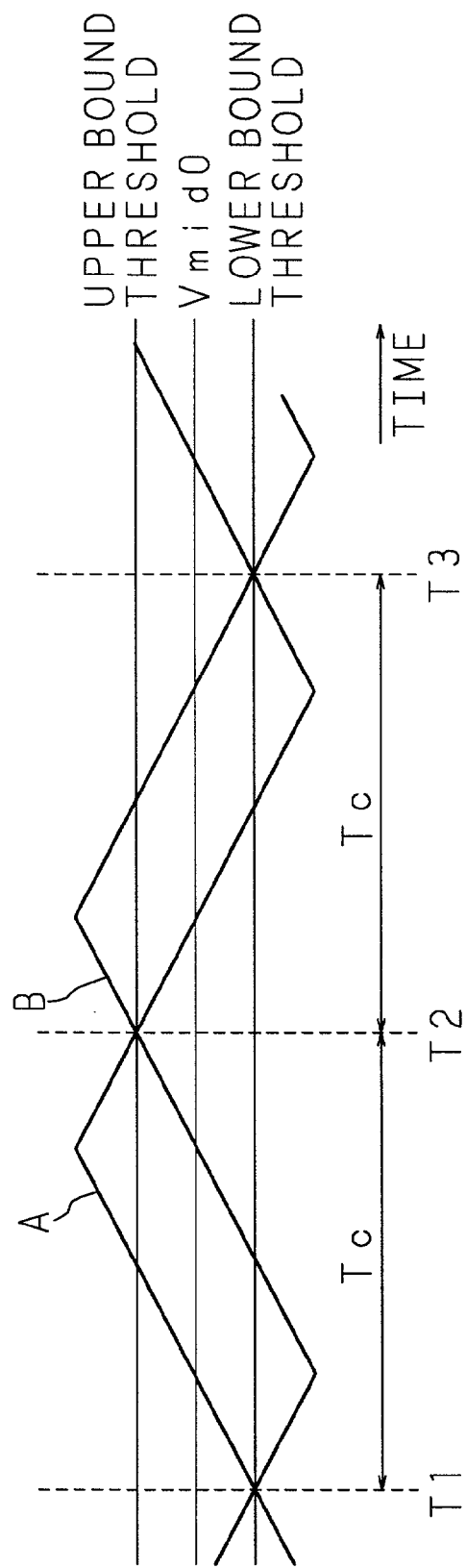
FIG. 4 is a wave form chart showing an example of detection signals of MR sensors shown in FIG. 1.
Figure 6:
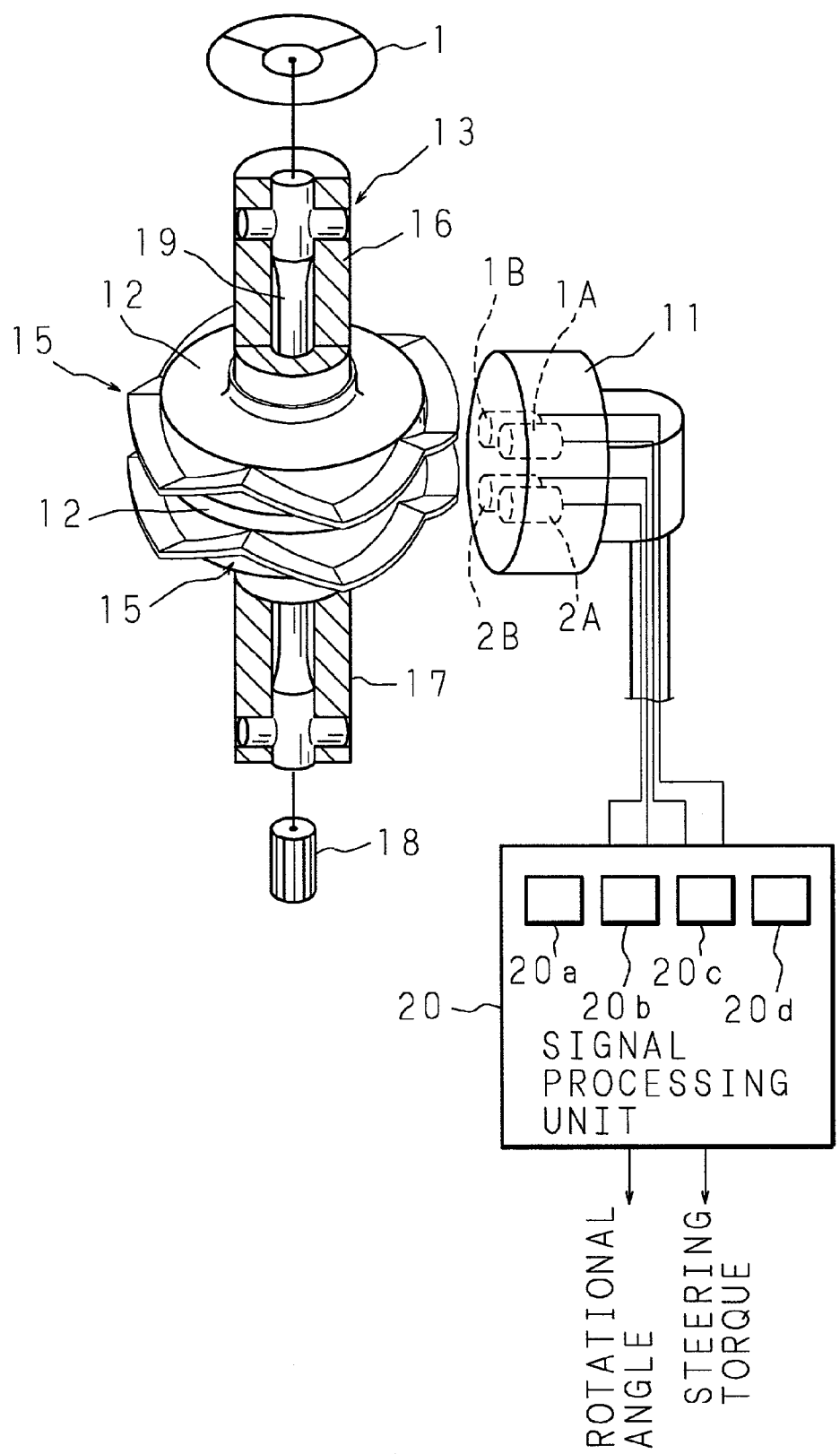
FIG. 6 is a schematic representation which schematically shows an example of a constitution of an embodiment of a torque detecting apparatus and a steering apparatus comprising a maximum and minimum values detecting apparatus according to the present invention.

FIG. 6 shows an example of a constitution of a torque detecting apparatus and a steering apparatus comprising a maximum and minimum values detecting apparatus according to the present invention. Like codes are used to refer to the same parts as those in the conventional apparatus (FIG. 1). The following description will explain correction of detection signals A and B which are, for example, triangular pulses with phases 90° different from each other as shown in FIG. 4. The difference between the phases of the signals A and B is not limited to 90°. Moreover, the signal shape is not limited to a triangular pulse.

The maximum and minimum values detecting apparatus according to a present invention is included in a signal processing unit 20. The signal processing unit 20 comprises a microprocessor. The signal processing unit 20 operates as: crossing detecting means for detecting a crossing of the detection signals A and B; means for detecting maximum and minimum values (hereinafter referred to as "tentative maximum values" and "tentative minimum values") of the signals A and B within a time interval Tc between a series of two detected crossings; and means for deciding maximum and minimum values of the detection signals A and B based on the detected tentative maximum and minimum values.

The signal processing unit 20 comprises registers 20$a$, 20$b$, 20$c$ and 20$d$. The register 20$a$ stores a reference amplitude Vpp0 and a reference median Vmid0. The register 20$b$ stores a maximum value Amax and a minimum value Amin of the detection signal A, and a maximum value Bmax and a minimum value Bmin of the detection signal B. The register 20$c$ stores a tentative maximum value Amax' and a tentative minimum value Amin' of the detection signal A within a time interval Tc, and a tentative maximum value Bmax' and a tentative minimum value Bmin' of the detection signal B within a time interval Tc.

The register 20$d$ stores values of the detection signals A and B at the time of detection of a crossing. More particularly, stored are a value (an upper cross value) larger than the reference median Vmid0 and a value (a lower cross value) smaller than the reference median Vmid0. Hereinafter, the larger values of the detection signals A and B are respectively referred to as Ac1 and Bc1, and the smaller values of the detection signals A and B are respectively referred to as Ac2 and Bc2.

If the detection signals A and B are digital signals, a crossing is detected when the magnitude relation between a signal value (a sampling value) As and a signal value (a sampling value) Bs which were sampled within a predetermined time interval is inverted. The sampling values As and Bs (As≅Bs) at the time of detection of the crossing of the detection signals A and B are stored as upper cross values Ac1 and Bc1 or as lower cross values Ac2 and Bc2. The register 20$d$ may store only an upper cross value Ac1 (=Bc1) and a lower cross value Ac2 (=Bc2), considering As to be equal with Bs.

The signal processing unit 20 operates as: means for comparing each magnitude of the upper cross values Ac1 and Bc1 with each magnitude of the tentative maximum values Amax' and Bmax'; means for comparing each magnitude of the lower cross values Ac2 and Bc2 with each magnitude of the tentative minimum values Amin' and Bmin'; and means for deciding a maximum value Amax of the detection signal A and a minimum value Bmin of the detection signal B, or a minimum value Amin of the detection signal A and a maximum value Bmax of the detection signal B, in accordance with the two comparison results. Upon the above comparison of magnitude relation, passing of maximum and minimum values within the time interval Tc can be detected.

As shown in FIG. 4, for example, the detection signal A passes a maximum value Amax and the detection signal B passes a minimum value Bmin within the time interval between T1 and T2, while the detection signal A passes a minimum value Amin and the detection signal B passes a maximum value Amax within the time interval between T2 and T3. In the time interval between T1 and T2, the maximum value Amax of the detection signal A is larger than a signal value at the time T2 (the upper cross value Ac1), and the minimum value Bmin of the detection signal B is smaller than a signal value at the time T1 (the lower cross value Bc2). Similarly, in the time interval between T2 and T3, the maximum value Bmax of the detection signal B is larger than a signal value at the time T2 (the upper cross value Bc1), and the minimum value Amin of the detection signal A is smaller than a signal value at the time T3 (the lower cross value Ac2).

The signal processing unit 20 operates as: means for comparing each magnitude of signal values of a series of two detected crossings with a magnitude of the reference median Vmid; and means for comparing the two comparison results. Maximum and minimum values are detected only when one of the two detection results indicates that the reference median Vmid is larger and the other indicates that the reference median Vmid is smaller.

As shown in FIG. 4, for example, one of the detection signals A and B has a signal value larger than the reference median Vmid0, and the other has a signal value smaller than the reference median Vmid0. In this case, both of the detection signals A and B pass a maximum value and a minimum value within the time interval Tc.

Figure 7:
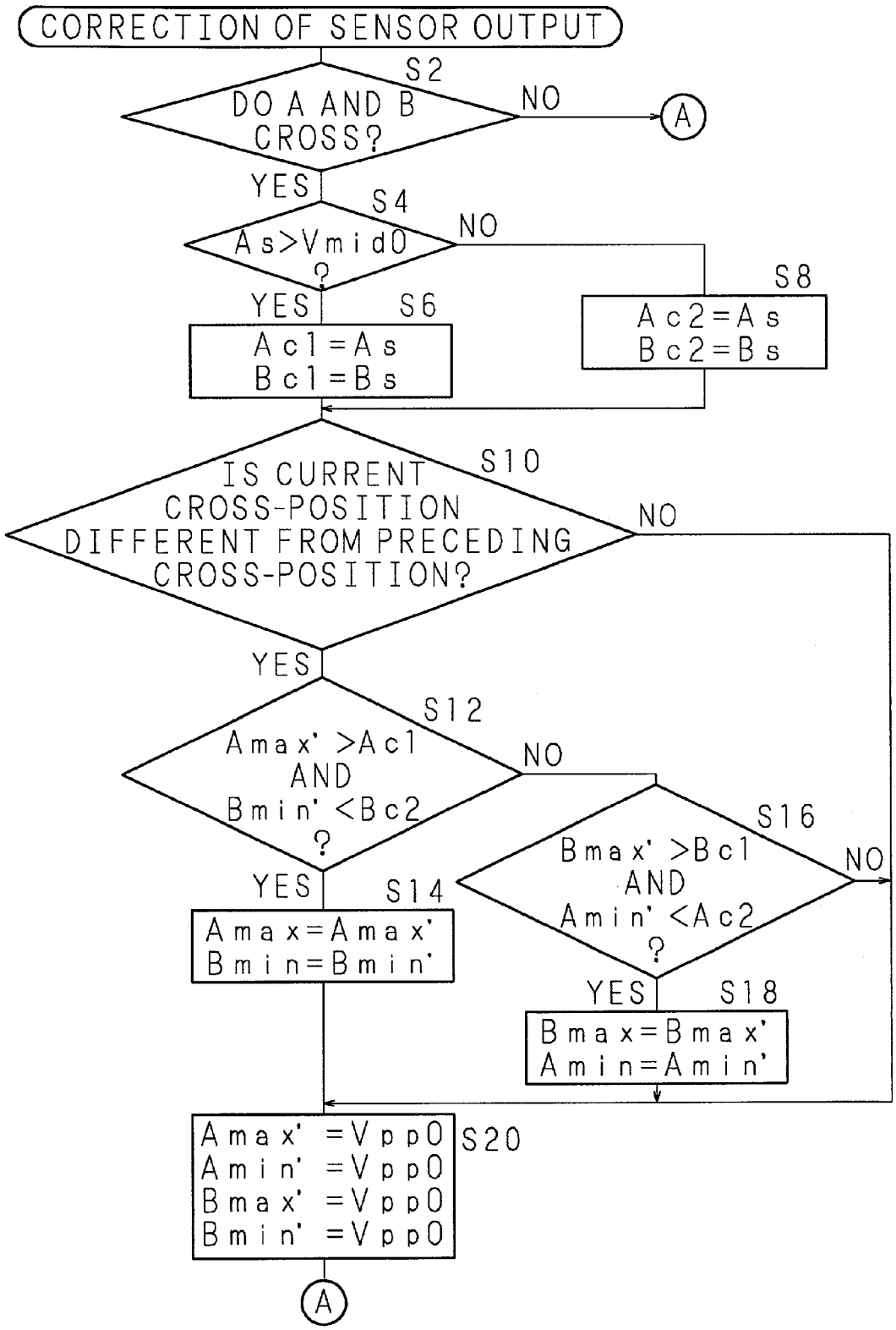
FIG. 7 is a flow chart showing an example of the sequence of processing for detecting maximum and minimum values of the signals A and B.

FIG. 7 shows the sequence of processing for detecting maximum values Amax and Bmax and minimum values Amin and Bmin, which is performed in the maximum and minimum values detecting apparatus and the maximum and minimum values detecting method according to the present invention. FIG. 7 also shows the sequence of processing for correcting a median and an amplitude of the detected maximum value and minimum value. The correction of the median and the amplitude is performed by the signal processing unit 20.

The signal processing unit 20 monitors whether a crossing of the detection signals A and B is detected (step S2). When a crossing is detected, the signal processing unit 20 compares a sampling value As (≃Bs) at the time with a reference median Vmid0 (step S4). When the reference median Vmid0 is smaller, the signal processing unit 20 updates upper cross values Ac1 and Bc1 respectively to be sampling values As and Bs (step S6). When the reference median Vmid0 is larger, the processing unit 20 updates lower cross values Ac2 and Bc2 respectively to be sampling values As and Bs (step S8).

Every time a crossing is detected, the signal processing unit 20 compares the magnitude relation between a signal value of one of the two crossings and a reference median Vmid0 with the magnitude relation between a signal value of the other of the two crossings and the reference median Vmid0, and confirms that the cross-positions of the two crossings in a vertical direction are different from each other with respect to the reference median Vmid0 (step S10).

When the current cross-position is different from the preceding cross-position, the signal processing unit 20 compares a magnitude of a tentative maximum value Amax' with a magnitude of an upper cross value Ac1, and compares a magnitude of a tentative minimum value Bmin' with a magnitude of a lower cross value Bc2 (step S12). When the comparison results come within the formulas:

Amax'>Ac1 and Bmin'<Bc2 the signal processing unit 20 updates the maximum value Amax to be the tentative maximum value Amax', and updates the minimum value Bmin to be the tentative minimum value Bmin' (step S14).

When the above comparison results do not come within the conditions (step S12), the signal processing unit 20 compares a magnitude of a tentative maximum value Bmax' with a magnitude of an upper cross value Bc1, and compares a magnitude of a tentative minimum value Amin' with a magnitude of a lower cross value Ac2 (step S16). When the comparison results come within the formulas:

Bmax'>Bc1 and Amin'<Ac2 the signal processing unit 20 updates the maximum value Bmax to be the tentative maximum value Bmax', and updates the minimum value Amin to be the tentative minimum value Amin' (step S18).

The signal processing unit 20 initializes the tentative maximum values Amax' and Bmax' and the tentative minimum values Amin' and Bmin' to be the reference median Vpp0 (step S20), when the maximum value Amax and the minimum value Bmin are updated (step S14), when the maximum value Bmax and the minimum value Amin are updated (step S18), when none of the maximum values Amax and Bmax and the minimum values Bmin and Amin is updated, and when the current cross-position is the same as the preceding cross-position.

Figure 8:
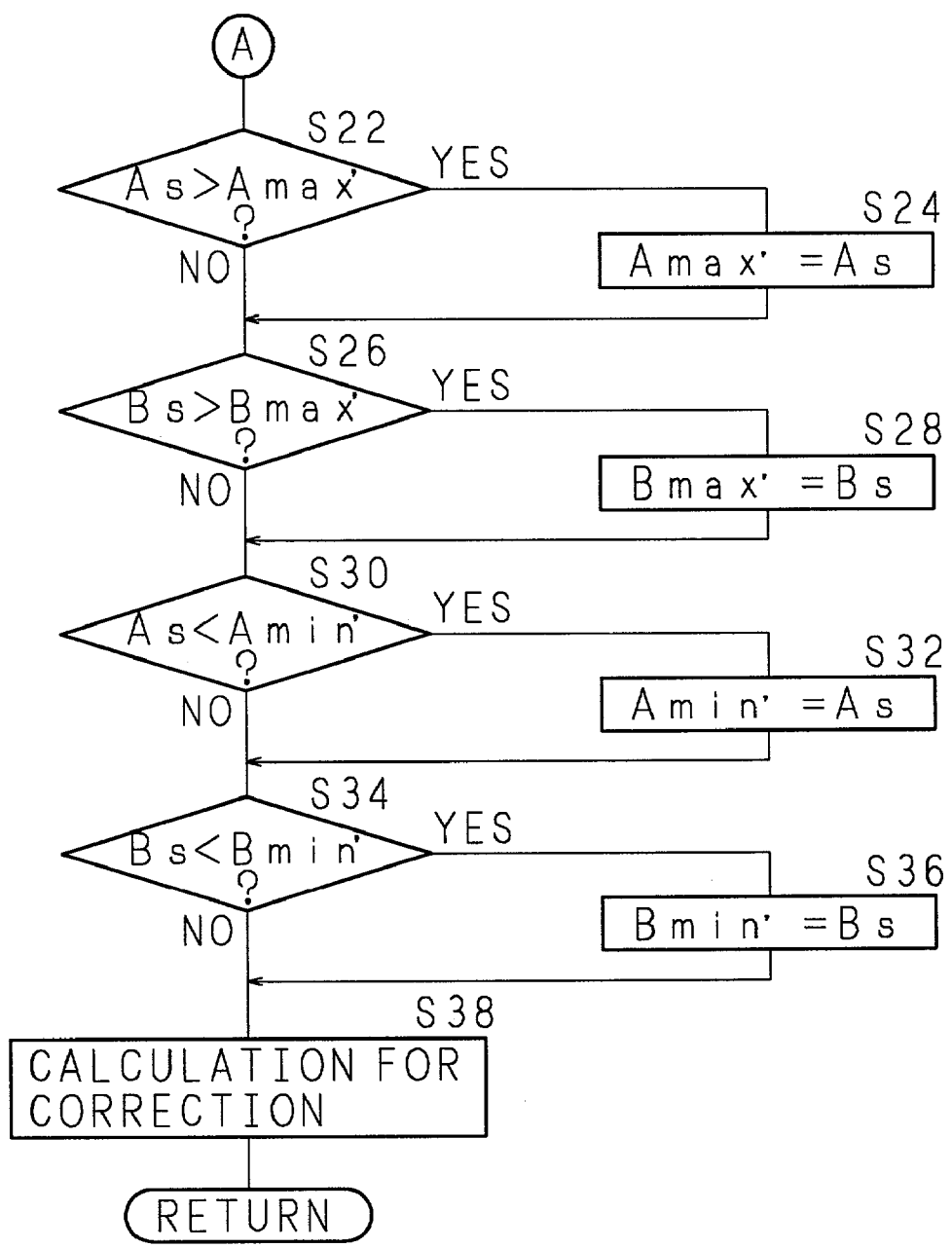
FIG. 8 is a flow chart showing an example of the sequence of processing for detecting tentative maximum and minimum values of the signals A and B.

After the initialization (step S20), or when no crossing of the detection signals A and B is detected, the signal processing unit 20 updates the tentative maximum value Amax' and the tentative minimum value Amin' of the detection signal A and the tentative maximum value Bmax' and the tentative minimum value Bmin' of the detection signal B, and corrects the sampling values As and Bs, as shown in FIG. 8.

The signal processing unit 20 compares a sampling value As of the detection signal A with a tentative maximum value Amax' (step S22). When the sampling value As is larger, the signal processing unit 20 updates the tentative maximum values Amax' to be a sampling value As (step S24). The signal processing unit 20 similarly compares a sampling value Bs with a tentative maximum value Bmax' (step S26), and updates the tentative value Bmax' to be the sampling value Bs when the sampling value Bs is larger (step S28). The signal processing unit 20 compares a sampling value As with a tentative minimum value Amin' (step S30), and updates the tentative minimum value Amin' to be the sampling value As when the sampling value As is smaller (step S32). The signal processing unit 20 compares a sampling value Bs with a tentative minimum value Bmin' (step S34), and updates the tentative minimum value Bmin' to be the sampling value Bs when the sampling value Bs is smaller (step S36).

The signal processing unit 20 calculates amplitudes App and Bpp and medians Amid and Bmid based on the maximum values Amax and Bmax and the minimum values Amin and Bmin, calculates the sampling values As and Bs with the formulas:

$$As=(Vpp0/App)\times(A-Amid)+Vmid0$$

$$Bs=(Vpp0/Bpp)\times(B-Bmid)+Vmid0$$

and corrects the sampling values As and Bs (step S38).

After the correction, the signal processing unit 20 goes back to the detection (step S2) of a crossing of detection signals A and B, and performs the same process repeatedly.

Second Embodiment

Figure 9:
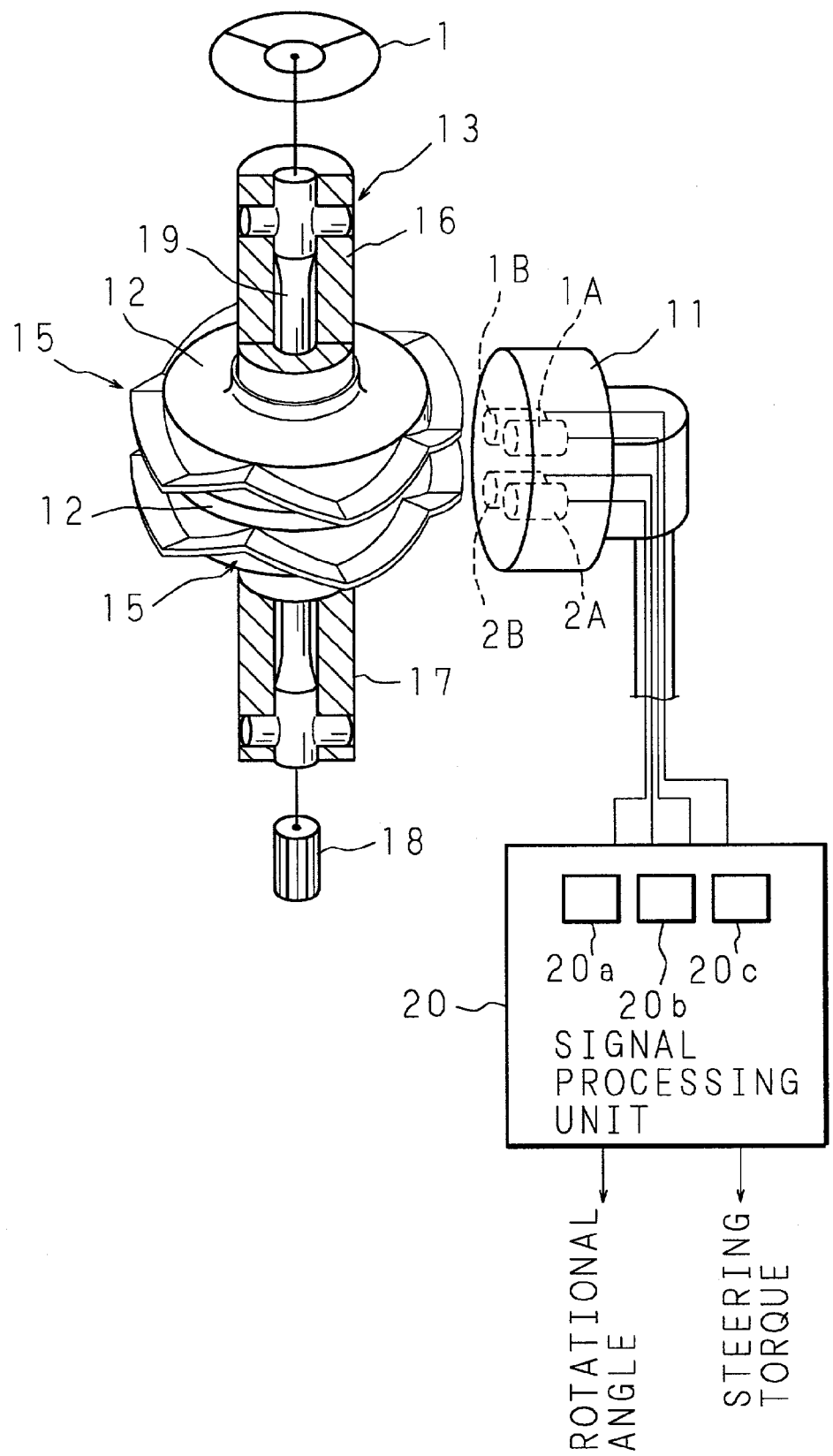
FIG. 9 is a schematic representation which schematically shows another example of a constitution of an embodiment of a torque detecting apparatus and a steering apparatus comprising a maximum and minimum values detecting apparatus according to the present invention.

FIG. 9 shows another example of a constitution of a torque detecting apparatus and a steering apparatus comprising a maximum and minimum values detecting apparatus according to the present invention. Like codes are used to refer to the same parts as those in the conventional apparatus. The following description will explain correction of detection signals A and B which are, for example, triangular pulses with phases 90° different from each other as shown in FIG. 4.

The maximum and minimum values detecting apparatus according to the present invention is included in the signal processing unit 20. The signal processing unit 20 comprises a microprocessor. The signal processing unit 20 operates as: crossing detecting means for detecting a crossing of the detection signals A and B; means for detecting maximum and minimum values (hereinafter referred to as "tentative maximum values" and "tentative minimum values") of the signals A and B within a time interval Tc between a series of two detected crossings; and means for deciding maximum and minimum values of the detection signals A and B based on the detected tentative maximum and minimum values.

The signal processing unit 20 comprises registers 20a, 20b and 20c. The registers 20a, 20b and 20c store the same values as those described in First Embodiment.

The signal processing unit 20 operates as: means for comparing a magnitude of the tentative maximum value Amax' of the detection signal A with a magnitude of the tentative maximum value Bmax' of the detection signal B, and for comparing a magnitude of the tentative minimum value Amin' of the detection signal A with a magnitude of the tentative minimum value Bmin' of the detection signal B; and means for deciding a maximum value Amax of the detection signal A and a minimum value Bmin of the detection signal B, or a minimum value Amin of the detection signal A and a maximum value Bmax of the detection signal B, in accordance with the comparison result. Upon the above comparison result, maximum and minimum values can be detected.

As shown in FIG. 4, for example, in the time interval between T1 and T2, the tentative maximum value Amax' (the maximum value Amax) is larger than the tentative maximum value Bmax', and the tentative minimum value Bmin' (the minimum value Bmin) is smaller than the tentative minimum value Amin'. Similarly, in the time interval between T2 and T3, the tentative maximum value Bmax' (the maximum value Bmax) is larger than the tentative maximum value Amax', and the tentative minimum value Amin' (the minimum value Amin) is smaller than the tentative minimum value Bmin'.

The signal processing unit 20 operates as: means for comparing each magnitude of the signal values of the two crossings with a magnitude of the reference median Vmid; and means for comparing the two comparison results. The signal processing unit 20 detects maximum and minimum values only when one of the two comparison results indicates that the reference median Vmid is larger and the other indicates that the reference median Vmid is smaller.

Figure 10:
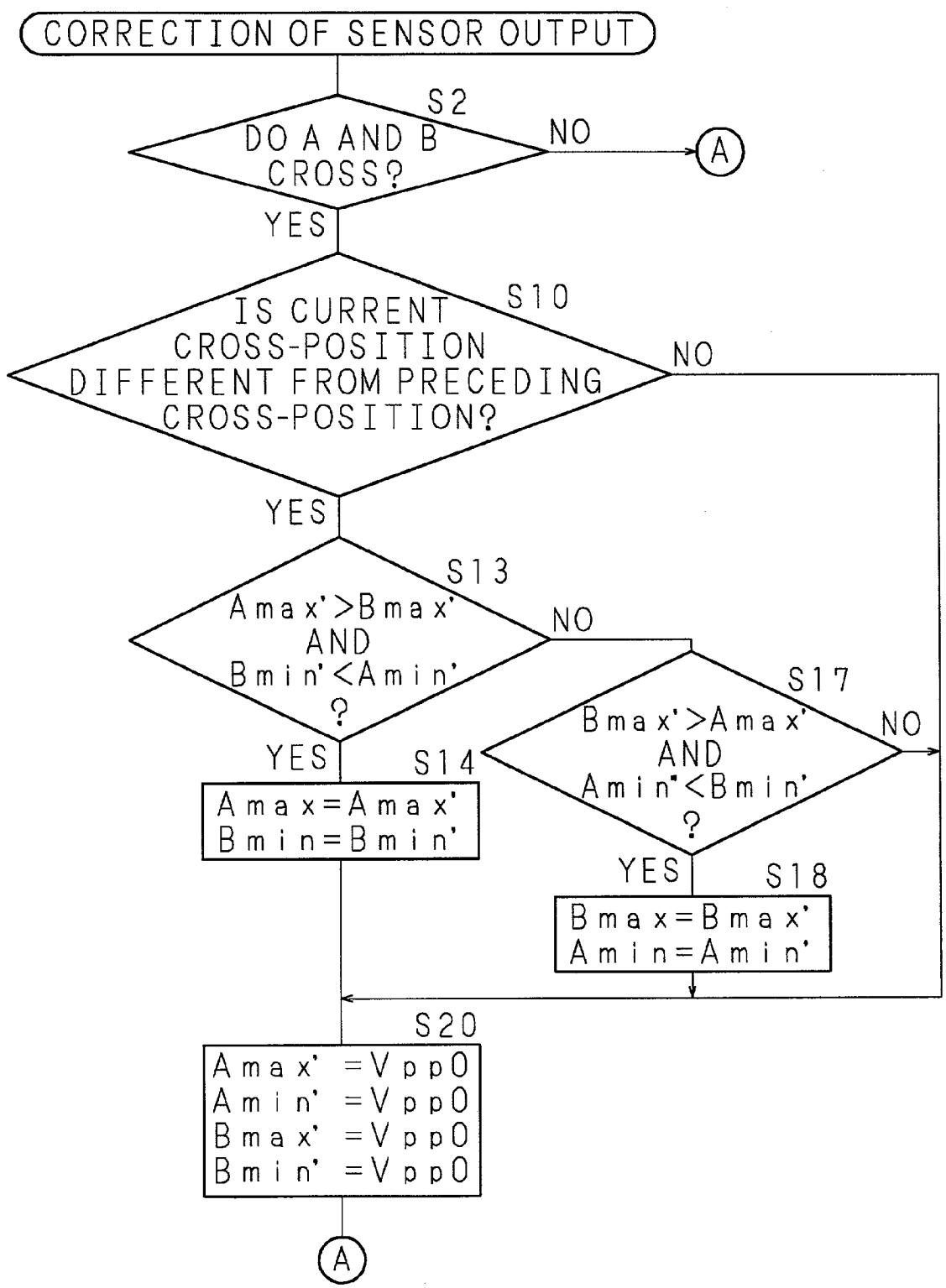
FIG. 10 is a flow chart showing another example of the sequence of processing for detecting maximum and minimum values of the signals A and B.

FIG. 10 shows the sequence of processing for detecting maximum values Amax and Bmax and minimum values Amin and Bmin of the apparatus and method for detecting maximum and minimum values according to the present invention. FIG. 10 also shows the sequence of processing for correcting a median and an amplitude of the detected maximum and minimum values. The processes S2, S10, S14, S18 and S20 of the present embodiment are same as those of First Embodiment.

The signal processing unit 20 detects a crossing of the detection signals A and B (step S2). When the current cross-position is different from the preceding cross-position (step S10), the signal processing unit 20 compares a tentative maximum value Amax' with a tentative maximum value Bmax', and a tentative minimum value Amin' with a tentative minimum value Bmin' (steps S13 and S17). When the comparison results come within the formulas:

Amax'>Bmax' and Bmin'<Amin', the signal processing unit 20 updates the maximum value Amax to be the tentative maximum value Amax', and updates the minimum value Bmin to be the tentative minimum value Bmin' (step S14). When the comparison results come within the formulas:

Bmax'>Amax' and Amin'<Bmin', the signal processing unit 20 updates the maximum value Bmax to be the tentative maximum value Bmax', and updates the minimum value Amin to be the tentative minimum value Amin' (step S18).

Afterwards, the signal processing unit 20 performs the same processes as those of First Embodiment.

Since the maximum values Amax and Bmax and the minimum values Amin and Bmin are detected based on the comparison result between the tentative maximum values Amax' and Bmax' and the comparison result between the tentative minimum values Amin' and Bmin' detected within the time interval Tc, the upper cross values Ac1 and Bc1 and the lower cross values Ac2 and Bc2 which are stored in the register 20*d* in First Embodiment are unnecessary in the present embodiment.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A maximum and minimum values detecting method for detecting maximum and minimum values of a first signal and a second signal having different phases, comprising:
   a crossing detecting step for detecting a crossing of the first signal and second signal;
   a step for detecting maximum and minimum values of each of the signals within a time interval between a series of two detected crossings; and
   a deciding step for deciding maximum and minimum values of each of the signals based on the maximum and minimum values detected within the time interval.

2. The maximum and minimum values detecting method according to claim 1,
   wherein the crossing detecting step further comprises a step for comparing each magnitude of signal values of the two detected crossings with a magnitude of a value to be a median of the signals,
   whereby maximum and minimum values of each of the signals are detected based on the maximum and minimum values detected within the time interval, when one of two comparison results indicates that the median is larger and the other indicates that the median is smaller.

3. The maximum and minimum values detecting method according to claim 2, wherein the deciding step further comprises:
   a first comparing step for comparing a magnitude of a signal value larger than the median with each magnitude of maximum values of the signals detected within the time interval;
   a second comparing step for comparing a magnitude of a signal value smaller than the median with each magnitude of minimum values of the signals detected within the time interval; and
   a step for deciding one of a combination of a maximum value of the first signal and a minimum value of the second signal and a combination of a minimum value of the first signal and a maximum value of the second signal, in accordance with comparison results of the first and second comparing steps.

4. The maximum and minimum values detecting method according to claim 2, wherein the deciding step further comprises:
   a third comparing step for comparing a magnitude of a maximum value of the first signal detected within the time interval with a magnitude of a maximum value of the second signal detected within the time interval;
   a fourth comparing step for comparing a magnitude of a minimum value of the first signal detected within the time interval with a magnitude of a minimum value of the second signal detected within the time interval; and
   a step for deciding one of a combination of a maximum value of the first signal and a minimum value of the second signal and a combination of a minimum value of the first signal and a maximum value of the second signal, in accordance with comparison results of the third and fourth comparing steps.

5. The maximum and minimum values detecting method according to claim 1, wherein the deciding step further comprises:
- a third comparing step for comparing a magnitude of a maximum value of the first signal detected within the time interval with a magnitude of a maximum value of the second signal detected within the time interval;
- a fourth comparing step for comparing a magnitude of a minimum value of the first signal detected within the time interval with a magnitude of a minimum value of the second signal detected within the time interval; and
- a step for deciding one of a combination of a maximum value of the first signal and a minimum value of the second signal and a combination of a minimum value of the first signal and a maximum value of the second signal, in accordance with comparison results of the third and fourth comparing steps.

6. A maximum and minimum values detecting apparatus for detecting maximum and minimum values of a first signal and a second signal having different phases, comprising:
- a crossing detecting unit for detecting a crossing of the first signal and second signal;
- a detecting unit for detecting maximum and minimum values of each of the signals within a time interval between a series of two detected crossings; and
- a maximum and minimum values deciding unit for deciding maximum and minimum values of each of the signals based on the maximum and minimum values detected within the time interval.

7. The maximum and minimum values detecting apparatus according to claim 6, wherein the crossing detecting unit further comprises:
- a first comparing unit for comparing each magnitude of signal values of the two detected crossings with a magnitude of a value to be a median of the signals; and
- a judging unit for judging whether one of two comparison results by the first comparing unit indicates that the median is larger and the other indicates that the median is smaller.

8. The maximum and minimum values detecting apparatus according to claim 7, wherein the maximum and minimum values deciding unit further comprises:
- a second comparing unit for comparing a magnitude of a signal value larger than the median with each magnitude of maximum values of the signals detected within the time interval, and for comparing a magnitude of a signal value smaller than the median with each magnitude of minimum values of the signals detected within the time interval; and
- a deciding unit for deciding one of a combination of a maximum value of the first signal and a minimum value of the second signal and a combination of a minimum value of the first signal and a maximum value of the second signal, in accordance with comparison results by the second comparing unit.

9. The maximum and minimum values detecting apparatus according to claim 7, wherein the maximum and minimum values deciding unit further comprises:
- a third comparing unit for comparing a magnitude of a maximum value of the first signal detected within the time interval with a magnitude of a maximum value of the second signal detected within the time interval, and for comparing a magnitude of a minimum value of the first signal detected within the time interval with a magnitude of a minimum value of the second signal detected within the time interval; and
- a deciding unit for deciding one of a combination of a maximum value of the first signal and a minimum value of the second signal and a combination of a minimum value of the first signal and a maximum value of the second signal, in accordance with comparison results by the third comparing unit.

10. The maximum and minimum values detecting apparatus according to claim 6, wherein the maximum and minimum values deciding unit further comprises:
- a third comparing unit for comparing a magnitude of a maximum value of the first signal detected within the time interval with a magnitude of a maximum value of the second signal detected within the time interval, and for comparing a magnitude of a minimum value of the first signal detected within the time interval with a magnitude of a minimum value of the second signal detected within the time interval; and
- a deciding unit for deciding one of a combination of a maximum value of the first signal and a minimum value of the second signal and a combination of a minimum value of the first signal and a maximum value of the second signal, in accordance with comparison results by the third comparing unit.

11. A torque detecting apparatus for detecting a torque applied to an input shaft based on a difference between angular displacements of the input shaft and an output shaft, comprising:
- an input shaft and an output shaft connected to each other via a connecting shaft;
- a target provided at the input shaft and output shaft, which is so shaped that an axial position thereof changes continuously as the input shaft and output shaft respectively rotates;
- a first detector for detecting a proximal portion of the target, which outputs a detection signal having a phase;
- a second detector for detecting a proximal portion of the target, which outputs a detection signal having a phase different from the phase of the detection signal outputted from the first detector at a predetermined electric angle;
- a maximum and minimum values detecting apparatus for detecting maximum and minimum values of the detection signals outputted from the first detector and second detector;
- a correcting apparatus for correcting values of the detection signals based on a median and an amplitude of the detected maximum and minimum values; and
- a detecting unit for detecting angular displacements in a rotational direction of the input shaft and output shaft based on the detection signals corrected by the correcting apparatus, the maximum and minimum values detecting apparatus comprising:
- a crossing detecting unit for detecting a crossing of a first signal and a second signal having different phases;
- a detecting unit for detecting maximum and minimum values of each of the signals within a time interval between a series of two detected crossings; and
- a maximum and minimum values deciding unit for deciding maximum and minimum values of each of the signals based on the maximum and minimum values detected within the time interval.

12. The torque detecting apparatus according to claim 11, wherein the crossing detecting unit of the maximum and minimum values detecting apparatus further comprises:

a first comparing unit for comparing each magnitude of signal values of the two detected crossings with a magnitude of a value to be a median of the signals; and a judging unit for judging whether one of two comparison results by the first comparing unit indicates that the median is larger and the other indicates that the median is smaller.

13. The torque detecting apparatus according to claim 12, wherein the maximum and minimum values deciding unit of the maximum and minimum values detecting apparatus further comprises:

a second comparing unit for comparing a magnitude of a signal value larger than the median with each magnitude of maximum values of the signals detected within the time interval, and for comparing a magnitude of a signal value smaller than the median with each magnitude of minimum values of the signals detected within the time interval; and a deciding unit for deciding one of a combination of a maximum value of the first signal and a minimum value of the second signal and a combination of a minimum value of the first signal and a maximum value of the second signal, in accordance with comparison results by the second comparing unit.

14. The torque detecting apparatus according to claim 12, wherein the maximum and minimum values deciding unit of the maximum and minimum values detecting apparatus further comprises:

a third comparing unit for comparing a magnitude of a maximum value of the first signal detected within the time interval with a magnitude of a maximum value of the second signal detected within the time interval, and for comparing a magnitude of a minimum value of the first signal detected within the time interval with a magnitude of a minimum value of the second signal detected within the time interval; and a deciding unit for deciding one of a combination of a maximum value of the first signal and a minimum value of the second signal and a combination of a minimum value of the first signal and a maximum value of the second signal, in accordance with comparison results by the third comparing unit.

15. The torque detecting apparatus according to claim 11, wherein the maximum and minimum values deciding unit of the maximum and minimum values detecting apparatus further comprises:

a third comparing unit for comparing a magnitude of a maximum value of the first signal detected within the time interval with a magnitude of a maximum value of the second signal detected within the time interval, and for comparing a magnitude of a minimum value of the first signal detected within the time interval with a magnitude of a minimum value of the second signal detected within the time interval; and a deciding unit for deciding one of a combination of a maximum value of the first signal and a minimum value of the second signal and a combination of a minimum value of the first signal and a maximum value of the second signal, in accordance with comparison results by the third comparing unit.

16. A steering apparatus comprising;

an input shaft joined to a steering wheel;

an output shaft joined to tire wheels;

a torque detecting apparatus for detecting a steering torque applied to the input shaft; and an electric motor for assisting rotation of the output shaft, which is driven in a controlled manner based on the detected steering torque, the torque detecting apparatus comprising:

a target provided at the input shaft and output shaft, which is so shaped that an axial position thereof changes continuously as the input shaft and output shaft respectively rotates;

a first detector for detecting a proximal portion of the target, which outputs a detection signal having a phase;

a second detector for detecting a proximal portion of the target, which outputs a detection signal having a phase different from the phase of the detection signal outputted from the first detector at a predetermined electric angle;

a maximum and minimum values detecting apparatus for detecting maximum and minimum values of the detection signals outputted from the first detector and second detector;

a correcting apparatus for correcting values of the detection signals based on a median and an amplitude of the detected maximum and minimum values; and a detecting unit for detecting angular displacements in a rotational direction of the input shaft and output shaft based on the detection signals corrected by the correcting apparatus, the maximum and minimum values detecting apparatus comprising:

a crossing detecting unit for detecting a crossing of a first signal and a second signal having different phases;

a detecting unit for detecting maximum and minimum values of each of the signals within a time interval between a series of two detected crossings; and a maximum and minimum values deciding unit for deciding maximum and minimum values of each of the signals based on the maximum and minimum values detected within the time interval.

17. The steering apparatus according to claim 16, wherein the crossing detecting unit of the maximum and minimum values detecting apparatus further comprises:

a first comparing unit for comparing each magnitude of signal values of the two detected crossings with a magnitude of a value to be a median of the signals; and a judging unit for judging whether one of two comparison results by the first comparing unit indicates that the median is larger and the other indicates that the median is smaller.

18. The steering apparatus according to claim 17, wherein the maximum and minimum values deciding unit of the maximum and minimum values detecting apparatus further comprises:

a second comparing unit for comparing a magnitude of a signal value larger than the median with each magnitude of maximum values of the signals detected within the time interval, and for comparing a magnitude of a signal value smaller than the median with each magnitude of minimum values of the signals detected within the time interval; and a deciding unit for deciding one of a combination of a maximum value of the first signal and a minimum value of the second signal and a combination of a minimum value of the first signal and a maximum value of the second signal, in accordance with comparison results by the second comparing unit.

19. The steering apparatus according to claim 17, wherein the maximum and minimum values deciding unit of the maximum and minimum values detecting apparatus further comprises:
- a third comparing unit for comparing a magnitude of a maximum value of the first signal detected within the time interval with a magnitude of a maximum value of the second signal detected within the time interval, and for comparing a magnitude of a minimum value of the first signal detected within the time interval with a magnitude of a minimum value of the second signal detected within the time interval; and
- a deciding unit for deciding one of a combination of a maximum value of the first signal and a minimum value of the second signal and a combination of a minimum value of the first signal and a maximum value of the second signal, in accordance with comparison results by the third comparing unit.

20. The steering apparatus according to claim 16, wherein the maximum and minimum values deciding unit of the maximum and minimum values detecting apparatus further comprises:
- a third comparing unit for comparing a magnitude of a maximum value of the first signal detected within the time interval with a magnitude of a maximum value of the second signal detected within the time interval, and for comparing a magnitude of a minimum value of the first signal detected within the time interval with a magnitude of a minimum value of the second signal detected within the time interval; and
- a deciding unit for deciding one of a combination of a maximum value of the first signal and a minimum value of the second signal and a combination of a minimum value of the first signal and a maximum value of the second signal, in accordance with comparison results by the third comparing unit.

* * * * *